(12) United States Patent
Harada et al.

(10) Patent No.: US 12,328,748 B2
(45) Date of Patent: Jun. 10, 2025

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 16/348,571

(22) PCT Filed: Nov. 10, 2017

(86) PCT No.: PCT/JP2017/040636
§ 371 (c)(1),
(2) Date: May 9, 2019

(87) PCT Pub. No.: WO2018/088538
PCT Pub. Date: May 17, 2018

(65) Prior Publication Data
US 2019/0261347 A1    Aug. 22, 2019

(30) Foreign Application Priority Data
Nov. 11, 2016  (JP) .................... 2016-220933

(51) Int. Cl.
*H04W 72/51*    (2023.01)
*H04L 5/00*     (2006.01)
(Continued)

(52) U.S. Cl.
CPC ........... *H04W 72/51* (2023.01); *H04L 5/0053* (2013.01); *H04W 16/28* (2013.01); *H04W 24/10* (2013.01);
(Continued)

(58) Field of Classification Search
CPC ..... H04L 5/005; H04L 5/0053; H04L 5/0048; H04L 1/0026; H04L 5/0094;
(Continued)

(56) References Cited

U.S. PATENT DOCUMENTS

2013/0163544 A1\*  6/2013  Lee ................. H04L 5/0048
                                                    370/329
2014/0177601 A1    6/2014  Nishio et al.
(Continued)

FOREIGN PATENT DOCUMENTS

CN    103220076 A    7/2013
JP    2014-007669 A  1/2014
(Continued)

OTHER PUBLICATIONS

International Search Report issued in PCT/JP2017/040636, mailed Jan. 30, 2018 (2 pages).
(Continued)

*Primary Examiner* — Yee F Lam
(74) *Attorney, Agent, or Firm* — Osha Bergman Watanabe & Burton LLP

(57) ABSTRACT

Even when multiple beams or transmission reception points are used, mobility is prevented from lowering. A user terminal according to one aspect of the present invention includes: a reception section that receives a plurality of measurement signals employing respectively different measurement resource configurations; a control section that controls measurement out of a measurement signal of the plurality of measurement signals corresponding to resource configuration information included in downlink L1/L2 signaling or selected based on a predetermined condition; and a transmission section that reports a measurement result.

4 Claims, 12 Drawing Sheets

(51) Int. Cl.
　　　*H04W 16/28*　　(2009.01)
　　　*H04W 16/32*　　(2009.01)
　　　*H04W 24/10*　　(2009.01)
　　　*H04W 72/04*　　(2023.01)
　　　*H04W 72/21*　　(2023.01)
　　　*H04W 72/23*　　(2023.01)
　　　*H04W 72/542*　(2023.01)
　　　*H04W 80/02*　　(2009.01)
　　　*H04W 88/02*　　(2009.01)

(52) U.S. Cl.
　　　CPC ......... *H04W 72/04* (2013.01); *H04W 72/21* (2023.01); *H04W 72/23* (2023.01); *H04W 72/542* (2023.01); *H04W 80/02* (2013.01); *H04W 88/02* (2013.01); *H04W 16/32* (2013.01)

(58) Field of Classification Search
　　　CPC ... H04L 5/0051; H04B 7/0626; H04B 7/0645; H04B 7/04; H04B 17/309; H04B 7/0617; H04B 7/088; H04W 72/042; H04W 36/0058; H04W 74/002; H04W 36/085; Y02B 70/30; Y02D 30/70
　　　See application file for complete search history.

(56) References Cited

U.S. PATENT DOCUMENTS

| | | | |
|---|---|---|---|
| 2015/0215022 A1 | 7/2015 | Nagata et al. | |
| 2015/0244444 A1* | 8/2015 | Mazzarese | H04W 72/042 370/252 |
| 2015/0264694 A1* | 9/2015 | Nagata | H04W 72/082 370/329 |
| 2016/0105817 A1* | 4/2016 | Frenne | H04L 5/0053 370/252 |
| 2016/0149679 A1* | 5/2016 | Frenne | H04L 5/005 370/329 |
| 2016/0277954 A1* | 9/2016 | Frenne | H04W 72/082 |
| 2017/0366998 A1* | 12/2017 | Lee | H04W 8/22 |
| 2018/0034525 A1 | 2/2018 | Park et al. | |
| 2018/0049137 A1* | 2/2018 | Li | H04B 17/309 |
| 2018/0062724 A1* | 3/2018 | Onggosanusi | H04B 7/0626 |
| 2018/0092129 A1* | 3/2018 | Guo | H04W 56/001 |
| 2018/0097600 A1* | 4/2018 | Bagheri | H04L 5/0051 |
| 2018/0103433 A1* | 4/2018 | Li | H04W 52/42 |
| 2018/0115355 A1 | 4/2018 | Nagata et al. | |
| 2018/0254812 A1* | 9/2018 | Park | H04B 7/0626 |
| 2018/0262250 A1* | 9/2018 | Kim | H04W 52/367 |
| 2018/0262251 A1* | 9/2018 | Kim | H04B 7/0465 |
| 2019/0090258 A1* | 3/2019 | Ryu | H04B 7/0632 |
| 2019/0173553 A1* | 6/2019 | Park | H04B 7/0617 |
| 2019/0261380 A1* | 8/2019 | Iyer | H04B 7/0695 |
| 2020/0059290 A1* | 2/2020 | Pan | H04B 7/0882 |
| 2021/0203387 A1 | 7/2021 | Park et al. | |

FOREIGN PATENT DOCUMENTS

| | | | | |
|---|---|---|---|---|
| WO | 2013021531 A1 | 2/2013 | | |
| WO | WO-2016105121 A1 * | 6/2016 | ......... | H04B 7/0417 |
| WO | 2016/126099 A1 | 8/2016 | | |
| WO | 2016/163542 A1 | 10/2016 | | |
| WO | 2016/163843 A1 | 10/2016 | | |

OTHER PUBLICATIONS

Written Opinion of the International Searching Authority issued in PCT/JP2017/040636, mailed Jan. 30, 2018 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 17868677.0, mailed on Jun. 8, 2020 (9 pages).

NTT DOCOMO, Inc.; "Discussion on NR RRM measurement based on CSI-RS for L3 mobility"; 3GPP TSG RAN WG1 Meeting #89, R1-1708445; Hangzhou, P.R. China; May 15-19, 2017 (9 pages).

Huawei, HiSilicon; "Discussion on efficient utilization of BF CSI-RS"; 3GPP TSG RAN WG1 Meeting #85, R1-164858; Nanjing, China; May 23-27, 2016 (4 pages).

Office Action issued in the counterpart Japanese Patent Application No. 2018-550288, mailed on Oct. 19, 2021 (13 pages).

Office Action issued in Japanese Application No. 2018-550288; Dated May 10, 2022 (11 pages).

Office Action issued for Chinese Application No. 201780082299.1 on Mar. 18, 2022 (12 pages).

Office Action issued in the counterpart Chinese Patent Application No. 201780082299.1, mailed on Aug. 3, 2022 (17 pages).

Office Action issued in Japanese Patent Application No. 2022-126822, mailed on Jun. 13, 2023 (6 pages).

* cited by examiner

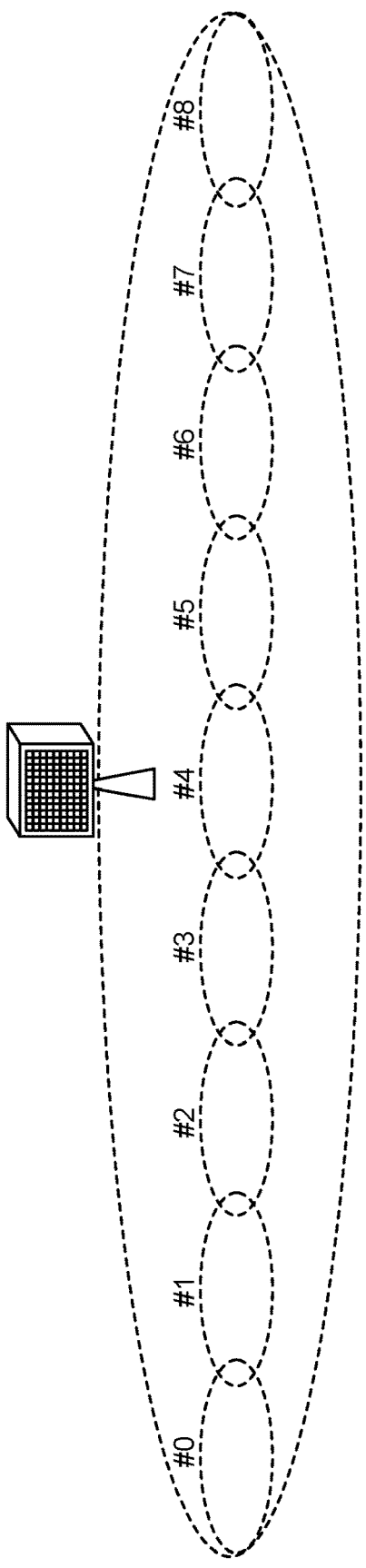

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified, and successor systems of LTE (referred to as, for example, Future Radio Access (FRA), the 5th generation mobile communication system (5G), New Radio (NR), New radio access (NX), Future generation radio access (FX) or LTE Rel. 13, 14, 15 or subsequent releases) have been also studied.

LTE Rel. 10/11 have introduced Carrier Aggregation (CA) that aggregates a plurality of Component Carriers (CCs) to obtain a wider band. A system band of LTE Rel. 8 is one unit that composes each CC. Furthermore, according to CA, a plurality of CCs of the identical base station (referred to as an eNB (eNodeB) or a Base Station (BS)) is configured to a user terminal (UE: User Equipment).

On the other hand, LTE Rel. 12 has introduced Dual Connectivity (DC), too, that configures a plurality of Cell Groups (CGs) of different radio base stations to a UE. Each cell group includes at least one cell (CC). DC aggregates a plurality of CCs of the different radio base stations, and therefore DC is also referred to as Inter-base station CA (Inter-eNB CA).

Furthermore, LTE Rel. 8 to 12 have introduced Frequency Division Duplex (FDD) that performs DownLink (DL) transmission and UpLink (UL) transmission in different frequency bands, and Time Division Duplex (TDD) that temporarily switches and performs downlink transmission and uplink transmission in the same frequency band.

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are expected to realize various radio communication services while meeting respectively different request conditions (e.g., an ultra high speed, a large volume or ultra low latency).

For example, it is studied for 5G/NR to provide radio communication services that are referred to as enhanced Mobile Broad Band (eMBB), Internet of Things (IoT), massive Machine Type Communication (mMTC), Machine To Machine (M2M) and Ultra Reliable and Low Latency Communications (URLLC).

By the way, LTE does not switch a cell based on measurement reporting of Channel State Information (CSI), and secures mobility by switching a UE communication destination and continuing communication. However, NR that is assumed to use multiple beams or transmission reception points has a risk that, when control is performed by using a legacy measurement reporting method, there are problems that a measurement load of the UE increases and mobility lowers.

The present invention has been made in light of this point, and one of objects of the present invention is to provide a user terminal and a radio communication method that can prevent mobility from lowering even when multiple beams or transmission reception points are used.

Solution to Problem

A user terminal according to one aspect of the present invention includes: a reception section that receives a plurality of measurement signals employing respectively different measurement resource configurations; a control section that controls measurement of a measurement signal out of the plurality of measurement signals corresponding to resource configuration information included in downlink L1/L2 signaling or selected based on a predetermined condition; and a transmission section that reports a measurement result.

Advantageous Effects of Invention

According to the present invention, even when multiple beams or transmission reception points are used, it is possible to prevent mobility from lowering.

BRIEF DESCRIPTION OF DRAWINGS

FIGS. 4A and 4B are diagrams illustrating one example of a group index notified by L1/L2 signaling according to the first embodiment.

DESCRIPTION OF EMBODIMENTS

For NR, a scenario that one cell includes a plurality of Transmission Reception Points (TPRs) or a plurality of beams has been studied. In addition, the TRP is, for example, a base station, and may be referred to simply as a Transmission Point (TP) or a Reception Point (RP).

Figure 1A:
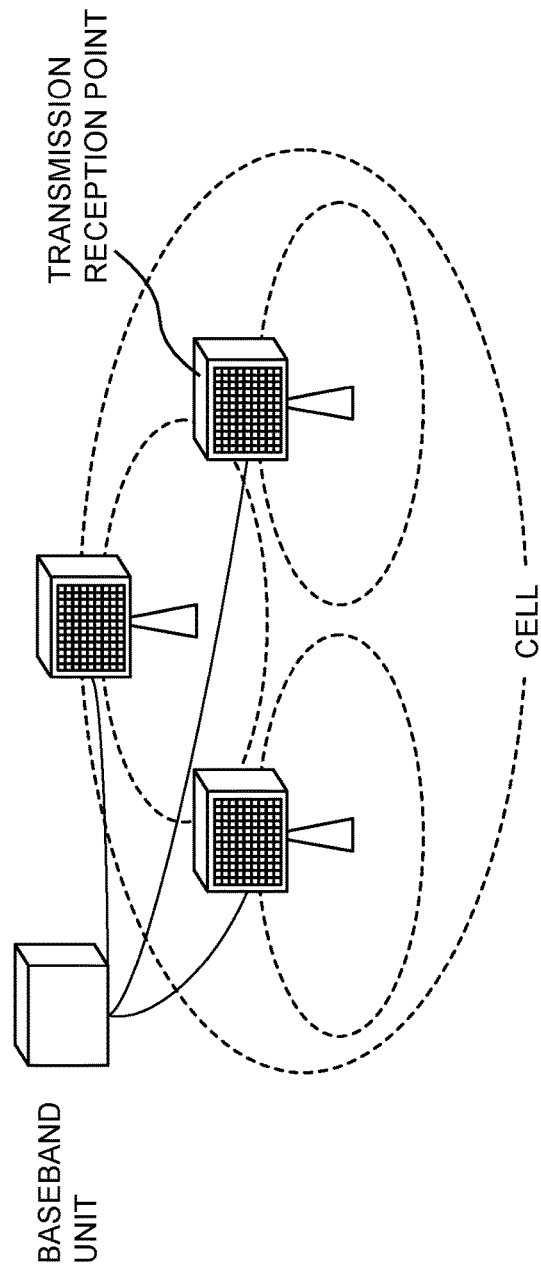
FIGS. 1A and 1B are diagrams illustrating one example of a scenario studied for NR.
Figure 1B:
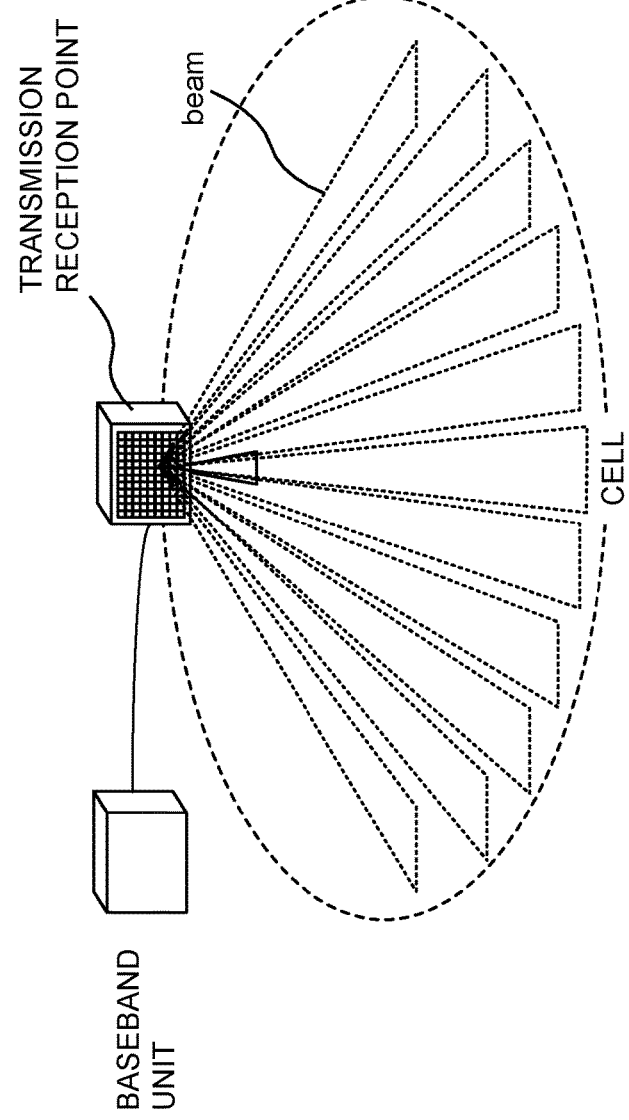

FIG. 1 is a diagram illustrating one example of a scenario studied for NR. FIG. 1A illustrates an example where a plurality of TRPs are connected to the same Base Band Unit (BBU), and FIG. 1B illustrates an example where one TRP is connected to a BBU. However, the BBU may be included in any TRP.

In a case of FIG. 1A, for example, transmission and reception of each TRP are controlled based on the same cell ID (Identify), and an area that integrates a coverage area of each TRP is handled as the same cell. Furthermore, in a case of FIG. 1B, an area that integrates a coverage area of each beam is handled as the same cell.

In this regard, it is assumed that, when an area covered by each beam/TRP is narrow, if the UE moves, the UE goes out of an area of a TRP/beam in which the UE has been performing communication. Means for regarding each beam/TRP as a "cell" and performing handover accompanying movement causes the following problems, for example: (1) a great amount of signaling accompanying the handover is produced, and (2) the UE goes out of an area to such a degree that the UE cannot communicate with a connection source cell (source cell) during handover processing, and does the handover processing from initial connection again. In addition, in this description, a "beam/TRP" may be used compatibly with "at least one of a beam and a TRP".

According to LTE, a Coordinated Multi-Point transmission/reception (CoMP) technique has been specified according to Rel-11, and a UE can perform Dynamic Point Selection (DPS) of performing measurement and reporting on a plurality of TRPs based on Channel State Information-Reference Signal (CSI-RS) and switching a TRP that is dynamically performing communication.

Figure 2:
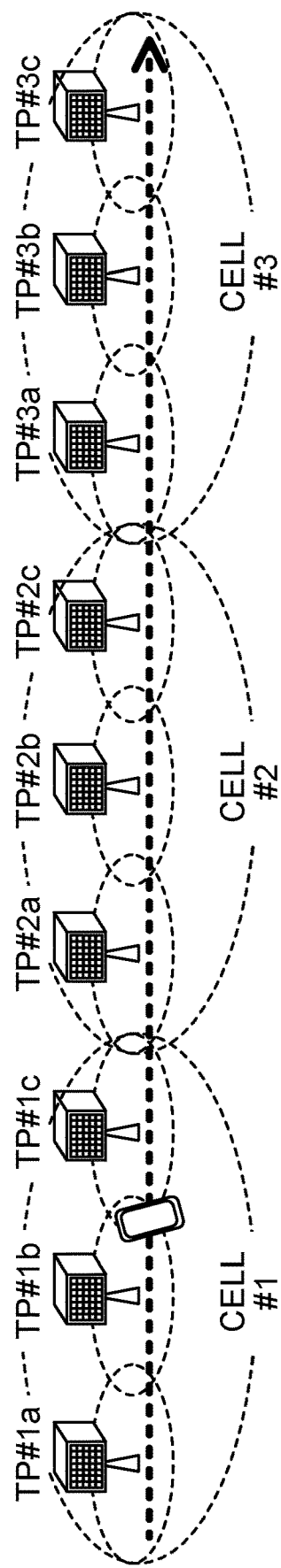
FIG. 2 is a diagram illustrating one example of a scenario 4 of Rel-11 CoMP.

A DPS control flow of CoMP will be described with reference to FIGS. 2 and 3. FIG. 2 is a diagram illustrating one example of a scenario 4 of Rel-11 CoMP. FIG. 2 illustrates an example where three cells (cells #1 to #3) each include three TPs (TPs #1a to #1c, TPs #2a to #2c or TPs #3a to #3c). When the UE resides in a coverage area of the TP #1b, and moves in a direction toward the TP #1c, DPS is controlled as illustrated in FIG. 3.

Figure 3A:
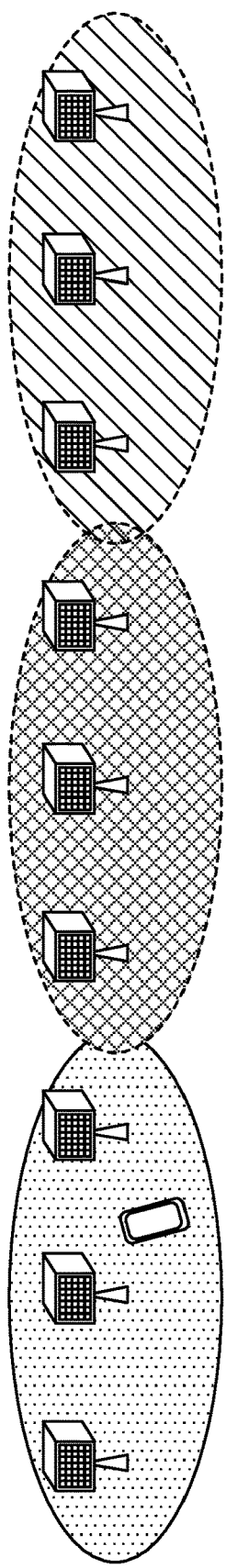
FIGS. 3A to 3C are diagrams illustrating one example of a DPS procedure.

FIG. 3 is a diagram illustrating one example of a DPS procedure. First, the UE detects a cell based on a synchronization signal (a Primary Synchronization Signal (PSS)/a Secondary Synchronization Signal (SSS)) and a Cell-specific Reference Signal (CRS), and performs Radio Resource Management (RRM) measurement reporting (FIG. 3A). In a case of FIG. 3A, it is recognized by the RRM measurement reporting that the UE resides in the cell #1. In addition, in this description, "measurement reporting" may be used compatibly with "measurement and/or reporting".

Figure 3B:
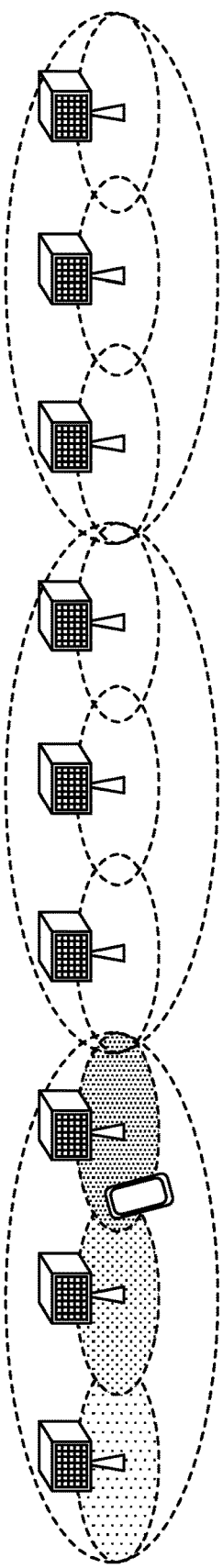

A plurality of (four at maximum) CSI processes for performing CIS measurement on each TRP is configured to the UE by a connected cell (FIG. 3B). In a case of FIG. 3B, three CSI processes associated with the TPs #1a to #1c are configured to the UE by the cell #1.

In addition, according to the RRM measurement reporting, the UE may report information related to received power (e.g., Reference Signal Received Power (RSRP)). According to CSI measurement reporting, the UE may report CSI related to at least one of a Channel State Indicator (COI), a Precoding Matrix Indicator (PMI), a Precoding Type Indicator (PTI), and a Rank Indicator (RI).

Figure 3C:
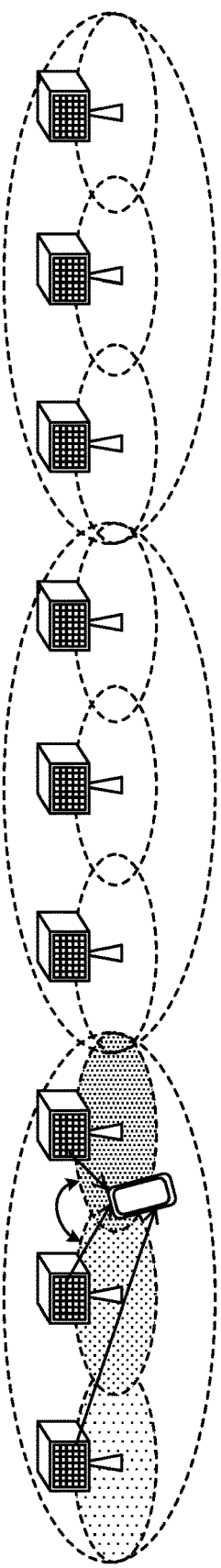

The UE measures and reports a CRI-RS transmitted from each TRP based on a configuration of the CSI process, and the network dynamically switches the TRP used for transmission and reception to and from the UE based on the reporting result (DPS) (FIG. 3C). In a case of FIG. 3C, the network decides that received quality of a signal from the TP #1c is the highest in the UE based on the measurement results of the TPs #1a to #1c reported from the UE, and uses the TP #1c of the TPs #1a to #1c for transmission and reception to and from the UE.

Thus, by using a plurality of CSI processes, it is possible to continue communication with the network while switching a communication destination TRP of the UE without switching a cell or reconfiguring RRC information even when the UE moves in the same cell. This is also referred to as layer 1/layer 2 mobility (L1/L2 mobility). In addition, the L1/L2 mobility cannot be maintained in a case of movement between cells, and it is necessary to switch a connected cell and reconfigure RRC information.

According to the CoMP technique of Rel-11 LTE, the maximum number of CSI processes of the UE is limited. Hence, when TRPs exceeding the maximum number of CSI processes are included in a cell, the base station and/or the UE cannot decide which CSI process related to which TRP needs to be configured to the UE. This is because, according to the RRM measurement reporting, only cell quality is measured, and individual TRPs are not measured (the TRPs are not distinguished).

Hence, Rel-12 LTE can configure a PSS/SSS/CRS and, in addition, a CSI-RS as a discovery signal for RRM measurement. In a case of the configuration including the CSI-RS as the discovery signal, the UE performs cell quality measurement reporting based on the CRS, and TRP quality measurement reporting based on the CSI-RS. Consequently, even when multiple TRPs are included in the identical cell, the base station can learn which CSI process related to which TRP needs to be configured to the UE by using the RRM measurement reporting.

By the way, it has been agreed for NR to support both of mobility (e.g., handover between cells) that requires RRC signaling, and L1/L2 mobility that does not require RRC signaling in an RRC connected state (RRC_CONNECTED mode).

Furthermore, it has been studied for NR to perform measurement reporting for beam selection by using a CRI-RS (CSI measurement RS) or a Mobility Reference Signal (MRS) as an L1/L2 beam control method in a scenario that a cell includes a plurality of beams. In this regard, the MRS only needs to be a signal that can be used as an RRM measurement RS, and may be a legacy synchronization signal (e.g., PSS/SSS), a legacy reference signal (e.g., a CRS or a CSI-RS) or a signal obtained by expanding/changing these signals.

Furthermore, it has been agreed for NR to measure and report at least one of cell quality and beam quality by using an MRS, an NR synchronization signal or another reference signal as RRM measurement (L3 mobility) in the RRC connected state.

That is, mobility realizing methods such as LTE CoMP and discovery signal-based RRM measurement have been studied for NR, too. For example, it is considered that a UE measures and reports cell quality and/or beam/TRP quality according to RRM measurement reporting, and a network configures CSI processes related to neighbor beams/TRPs to the UE by RRC signaling based on an RRM measurement reporting result to realize L3 mobility.

Furthermore, it is considered that the UE measures and reports configured beam/TRP quality according to CSI measurement reporting, and the network dynamically switches a beam/TRP used for communication with the UE based on a CSI measurement reporting result to realize L1/L2 mobility.

According to NR, it is thought that there are multiple beams/TRPs near the UE, and therefore it is demanded to configure multiple CSI processes to the UE. In this case, there are problems that a CSI measurement processing load increases and an uplink transmission overhead for reporting increases. Therefore, the maximum number of CSI processes of the UE is highly likely to be limited similar to LTE.

However, when the maximum number of CSI processes is limited, a movable range (that can be followed) of L1/L2 mobility substantially narrows (e.g., only a range of four beams), and CSI processes need to be immediately reconfigured by RRC. Furthermore, RRM measurement reporting and/or RRC reconfiguration processing require a very longer time than a CSI measurement reporting periodicity. For example, in a case of LTE, while the CSI measurement reporting requires five ms at minimum, maximum latency of the RRM measurement reporting is 200 ms.

As described above, NR has a problem that, when legacy RRM measurement reporting and CSI measurement reporting are used, a UE moving speed that can substantially maintain communication is limited.

Hence, the inventors of the present invention have conceived a mobility realizing method for enabling L1/L2 mobility in a wide range while suppressing increases in a CSI measurement load and a feedback overhead of the UE. Consequently, even in environments that have difficulty in securing mobility by a legacy method such as highly dense small cell environment and high frequency cell environment to which beam forming is applied by using multiple antenna elements, it is possible to improve mobility capability.

Embodiments according to the present invention will be described in detail below with reference to the drawings. A radio communication method according to each embodiment may be applied alone or may be applied in combination.

In addition, in this description, L1/L2 signaling is used compatibly with L1 signaling and/or L2 signaling. Furthermore, the CSI-RS may be used compatibly with at least one of the CSI-RS and the MRS. The CSI-RS and/or the MRS may be referred to as a measurement signal.

Radio Communication Method

First Embodiment

According to the first embodiment of the present invention, a base station dynamically instructs a CSI-RS that is a CSI measurement reporting target to a UE by using downlink L1/L2 signaling. In this regard, the downlink L1/L2 signaling may be Downlink Control Information (e.g., DCI) notified on a downlink control channel (e.g., PDCCH), may be Medium Access Control (MAC) signaling (e.g., a DL MAC Control Element (MAC CE)) or may be other L1 layer and/or L2 layer signaling.

The UE may be notified of CSI-RS resource configuration information (that may be also referred to as simply resource configuration information) that is, for example, a measurement reporting target by downlink L1/L2 signaling. The CSI-RS resource configuration information may be information for specifying a CSI-RS resource (e.g., at least one of a time resource and a frequency resource) or may be information associated with the CSI-RS resource.

For example, to suppress the necessary number of bits for notification, multiple CSI-RS resource configurations may be configured in advance by higher layer signaling (e.g., RRC signaling, MAC signaling or broadcast information (a Master Information Block (MIB) or a System Information Block (SIB)), and only indices of the CSI-RS resource configurations may be notified by downlink L1/L2 signaling. In this case, the resource configuration information is the indices.

The indices may be referred to as resource configuration indices or may be referred to as CSI-RS configuration indices. In addition, the CSI-RS resource configuration may be referred to as a measurement resource setting or a measurement resource configuration.

Furthermore, the CSI-RS resource configuration may be configured by higher layer signaling or may be defined by a specification. Furthermore, an association between the CSI-RS configuration indices and the CSI-RS resource configurations may be configured by higher layer signaling or may be defined by the specification.

The index notified by downlink L1/L2 signaling may be index indicating individual CSI-RS resource configuration or may be index (that may be referred to as group index) collectively indicating a plurality of CSI-RS resource configurations.

FIG. 4 is a diagram illustrating one example of the group indices notified by downlink L1/L2 signaling according to the first embodiment. FIG. 4A illustrates an example where a plurality of beams can be formed in a coverage of the base station, and a CSI-RS is transmitted based on a different CSI-RS resource configuration by each beam. In addition, FIG. 4 illustrates an example where CSI-RS configuration indices #0 to #8 are associated with nine beams. However, the number of beams and index numbers are not limited to these.

Furthermore, a coverage of one beam in FIG. 4 may be read as a coverage of one TRP. The same applies to subsequent diagrams, too.

FIG. 4B is a diagram illustrating one example of an association between the group indices and the CSI-RS resource configuration indices. FIG. 4B illustrates that a group index #0 is associated with the CSI-RS resource configuration indices #0, #1 and #2, and the group indices #0 to #N are each associated with a set of three CSI-RS resource configuration indices. However, the association is not limited to this. For example, the number of CSI-RS resource configuration indices associated the group indices may be different, and may be zero or a number equal to or more than one.

The CSI-RS resource configuration information notified by downlink L1/L2 signaling may include information indicating to add or delete a predetermined CSI-RS resource configuration (e.g., a predetermined CSI-RS configuration index or a predetermined group index) as a measurement reporting target.

In addition, downlink L1/L2 signaling may notify a measurement reporting target CSI-RS scrambling ID (scrambling identity), a beam index for a beam used for transmission of the CSI-RS and a TRP index associated with a TRP which has transmitted the CSI-RS.

The UE specifies a CSI-RS resource configuration based on the notified information, and performs CSI measurement reporting on the resource configuration.

FIG. 5 is a diagram illustrating one example of the CSI measurement reporting according to the first embodiment. FIG. 5 assumes the same environment as that in FIG. 4A.

Figure 5A:
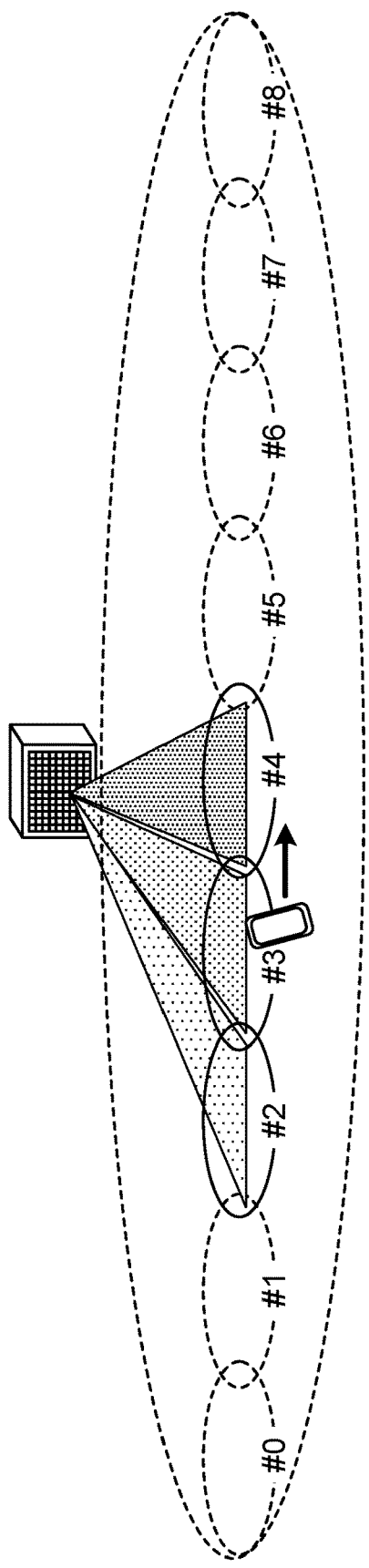
FIGS. 5A and 5B are diagrams illustrating one example of CSI measurement reporting according to the first embodiment.

In FIG. 5A, the base station notifies the UE of the CSI-RS resource configuration indices #2, #3 and #4 (or the group index #2 associated with these indices) by downlink L1/L2 signaling to enable the UE to perform CSI measurement reporting on a beam directed to the vicinity of the UE. The UE performs CSI measurement by using resources associated with the notified indices, and transmits a CSI report to the base station.

When the UE moves to the right from a position in FIG. 5A, RSRP and/or a CSI measurement result based on the CSI-RS resource configuration index #2 are assumed to deteriorate (lower) in the UE. In this case, the base station may perform control to remove the CSI-RS resource configuration index #2 from the CSI measurement reporting target, and add the CSI-RS resource configuration index #5 as the CSI measurement reporting target (FIG. 5B).

Figure 5B:
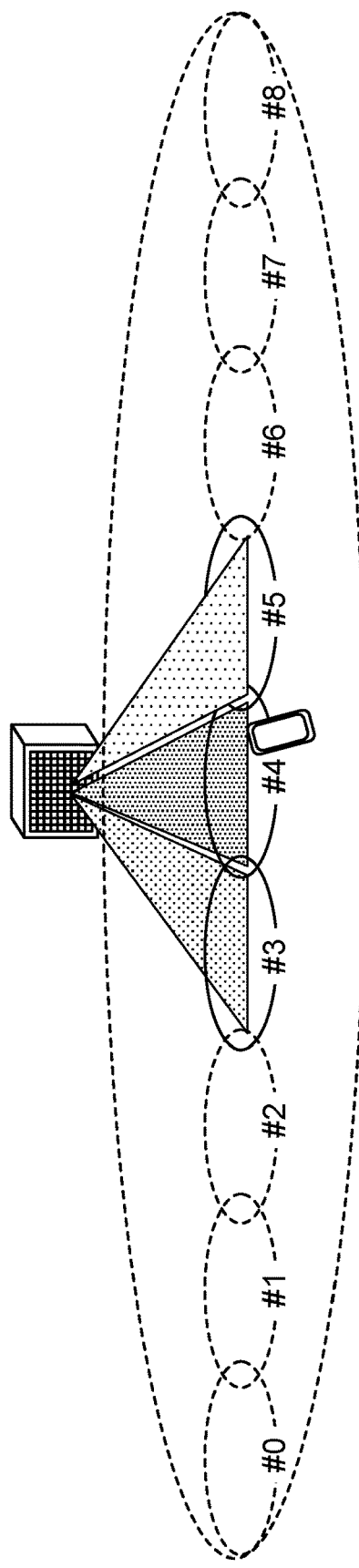

In a case of, for example, FIG. 5B, the UE may be notified of the CSI-RS resource configuration indices #3, #4 and #5 (or the group index #3 associated with these indices) by downlink L1/L2 signaling. Furthermore, the UE may be notified of information indicating that the CSI-RS resource configuration index #2 is removed from the CSI measurement reporting target, and the CSI-RS resource configuration index #5 is added to the CSI measurement reporting target.

According to the above-described first embodiment, it is possible to switch a CSI measurement reporting target in a short time by downlink L1/L2 signaling, so that it is possible to widen an L1/L2 mobility target range.

Second Embodiment

According to the second embodiment of the present invention, a UE autonomously changes a CSI measurement reporting target CSI-RS. For example, the UE may select (determine) resource configuration information based on predetermined conditions, and measure and report a CSI-RS corresponding to the resource configuration information.

For example, the above predetermined conditions may include that the measurement result of the CSI-RS based on predetermined resource configuration information is a predetermined threshold or less. In this case, the UE may select resource configuration information different from the predetermined resource configuration information as the CSI measurement reporting target.

In addition, the CSI-RS measurement result may be at least one of received power (e.g., RSRP), received quality (e.g., Reference Signal Received Quality (RSRQ) or a Signal to Interference plus Noise Ratio (SINR)), and a signal strength (e.g., Received Signal Strength Indicator (RSSI)).

Control information (e.g., the above predetermined threshold) for autonomously switching the CSI measurement reporting target (i.e., for deciding the predetermined conditions) may be notified to the UE by higher layer signaling (e.g., RRC signaling) or may be defined by the specification.

Furthermore, when a predetermined CSI-RS resource configuration is notified by RRC signaling (or in another case), a relationship (association) between the CSI-RS resource configuration and an MRS or another CSI-RS resource configuration may be notified, and an autonomous selection rule (a priority or conditions) may be notified to the UE. Information related to these relationship and rule can be also referred to as control information for autonomous switching.

Furthermore, for example, information related to based on which signal a measurement reporting target is decided (e.g., whether the measurement reporting target is decided based on measurement of a CSI-RS or decided based on measurement of an MRS) may be notified.

In this regard, when making decision based on the MRS is configured, an association between the MRS and the CSI-RS resource configuration is preferably configured as the above relationship. For example, one or a plurality of CSI-RS resource configurations may be associated with one MRS. In this case, the UE can determine the measurement reporting target CSI-RS resource configuration based on an MRS measurement result.

Furthermore, information related to which index each neighbor beam/TRP corresponds to (i.e., information related to which beam/TRP corresponding to which index a beam/TRP associated with a predetermined index is neighboring) may be notified as the above relationship. The UE may estimate (predict) which signal of a beam/TRP becomes strong accompanying movement, based on the information, and determine a CSI-RS resource configuration associated with the beam/TRP estimated to become strong as a measurement reporting target.

When autonomously changing (selecting or determining) a measurement reporting target CSI-RS, the UE may report which CSI-RS resource configuration is targeted to measure and report to the base station. For example, the UE may include specifying information (e.g., resource configuration information (a CIS-RS configuration index or a group index)) for specifying the selected measurement reporting target CSI-RS in UCI to report during reporting of a measurement result (CSI reporting).

Furthermore, the UE may report specifying information (e.g., resource configuration information) for specifying a measurement reporting target CSI-RS by using uplink L1/L2 signaling separately from UCI used to report the measurement result. In this regard, uplink L1/L2 signaling may be uplink control information (e.g., UCI) notified by an uplink control channel (e.g., PUCCH), may be MAC signaling (e.g., UL MAC CE) or may be other L1 layer and/or L2 layer signaling.

In addition, the uplink L1/L2 signaling may report a measurement reporting target CSI-RS scrambling ID, a beam index for a beam used for transmission of the CSI-RS, and a TRP index associated with a TRP at which the CSI-RS has been transmitted.

According to the above-described second embodiment, the UE can autonomously switch the CSI measurement reporting target, and consequently widen the L1/L2 mobility target range.

Third Embodiment

To appropriately select and switch a CSI measurement reporting target CSI-RS accompanying movement as described in the first and second embodiments, a base station and/or a UE preferably specify a beam/TRP that is a CSI measurement reporting candidate. Furthermore, when RRM reporting is used for specifying this beam/TRP, there is a risk that a periodicity is too long to follow the movement of the UE.

Hence, according to the third embodiment of the present invention, the UE is configured to measure and report a CSI-RS, and is enabled to monitor a beam/TRP of high received quality at a shorter periodicity than that of the RRM measurement reporting. The UE reports a measurement result (e.g., received power measurement result) at a shorter periodicity than that of the RRM measurement reporting by using uplink L1/L2 signaling. In addition, measurement reporting of the CSI-RS described in the third embodiment may be referred to as L1/L2 measurement reporting or L1/L2 mobility measurement reporting.

The base station may determine the CSI measurement reporting target CSI-RS described in the first and second embodiments based on the measurement result notified by using uplink L1/L2 signaling from the UE, and notify the UE of CSI-RS resource configuration information associated with the CSI measurement reporting target CSI-RS.

Figure 6A:
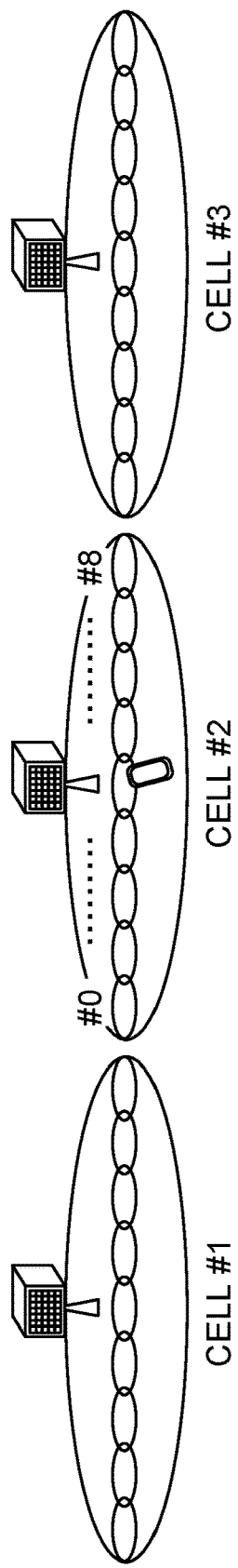
FIGS. 6A to 6C are diagrams illustrating one example of a beam control flow according to a second embodiment.
Figure 6B:
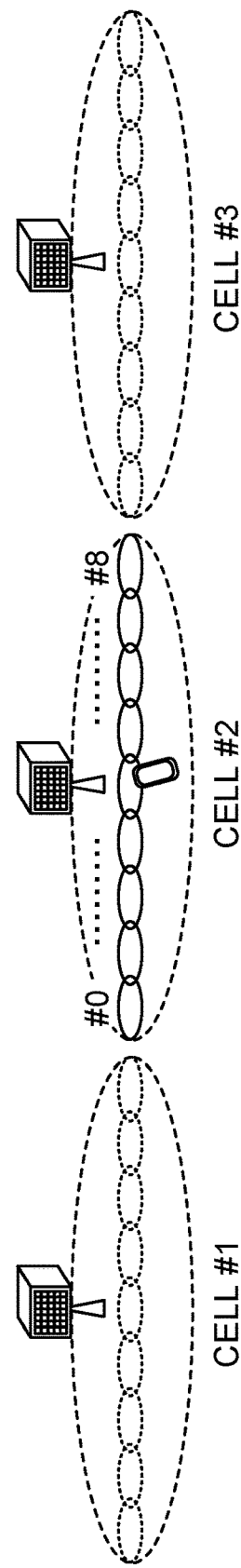
Figure 6C:
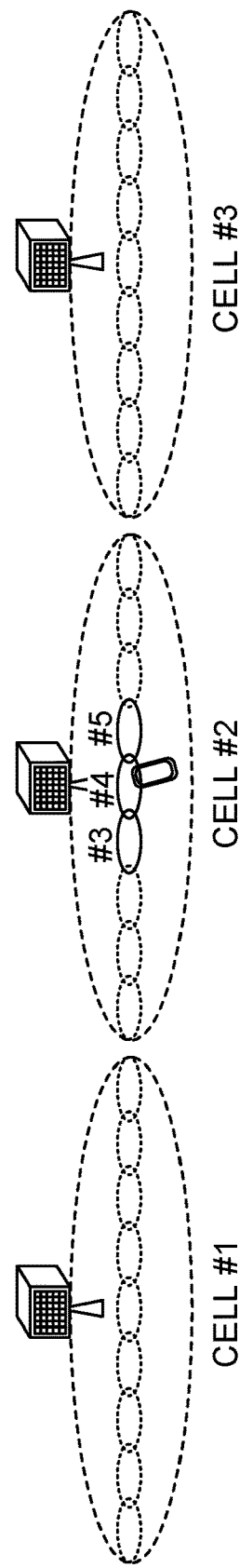

FIG. 6 is an explanatory diagram of L1/L2 measurement reporting according to the third embodiment. FIG. 6 illustrates cells (cells #1 to #3) formed by three base stations, respectively, and illustrates a coverage of nine beams of each cell. Furthermore, the UE resides in the cell #2. FIG. 6A illustrates one example of RRM measurement reporting, FIG. 6B illustrates one example of L1/L2 measurement reporting, and FIG. 6C illustrates one example of CSI measurement reporting.

According to the RRM measurement reporting, the UE measures not only a residing cell (including a beam/TRP) but also neighbor cells (including beams/TRPs), and reports M (>0) indices at maximum in order of higher received power and received power by L3 signaling (RRC signaling). In a case of FIG. 6A, the UE performs measurement reporting based on signals transmitted by the three cells.

On the other hand, according to the CSI measurement reporting, the UE measures and reports CSI (e.g., a CQI, a PMI or an RI) of (a CSI-RS resource configuration of) a beam/TRP configured according to UE capability of the number of CSI processes. This reporting is performed by L1 signaling (UCI). In a case of FIG. 6C, the UE performs measurement reporting based on the signal transmitted by using CSI-RS configuration indices #3 to #5 configured to the cell #2.

Furthermore, according to the L1/L2 measurement reporting, the UE is configured to measure and report (a CSI-RS resource configuration of) a beam/TRP (e.g., in a cell) that can be a CSI measurement reporting target. An L1/L2 measurement reporting target resource configuration may be configured to the UE. The UE may report all configured beams/TRPs or may report only a predetermined number of configured beams/TRPs in order of higher received power. This reporting may be performed by L1 signaling (UCI) or L2 signaling (MAC signaling). In a case of FIG. 6B, the UE performs measurement reporting based on a signal transmitted by using CSI-RS configuration indices #0 to #8 configured to the cell #2.

In addition, the number of CSI-RS resource configurations for L1/L2 measurement reporting is preferably larger than the number of CSI-RS resource configurations for CSI measurement reporting.

The UE may be notified of at least one of a configuration of a (L1/L2 measurement reporting target) CSI-RS for L1/L2 measurement reporting and a reporting configuration in addition to CSI measurement by higher layer signaling (e.g., RRC signaling). In this regard, the reporting configuration may include information related to a reporting periodicity or may include information related to an event for performing reporting (triggering).

According to a trigger event, a measurement result based on at least one configuration among, for example, configurations of configured CSI-RSs may exceed a predetermined threshold, or a difference between a measurement result based on a certain configuration and a measurement result based on another configuration may exceed a predetermined offset among the configurations of the configured CSI-RSs. Furthermore, on an opportunity that the UE receives downlink L1/L2 signaling (e.g., DCI) for instructing L1/L2 measurement reporting irrespectively of the reporting configuration, the UE may perform L1/L2 measurement reporting at a predetermined timing (e.g., a certain time after reception of DCI).

By using uplink L1/L2 signaling (e.g., UCI or a UL MAC CE), the UE may report information of received power (that may be referred to as CSI-RSRP) measured by using a CSI-RS. Furthermore, the UE may report specifying information (e.g., CIS-RS resource configuration information (e.g., a CSI-RS configuration index or a group index), a scrambling ID, a beam index or a TRP index) for specifying a CSI-RS associated with (used for measuring) CSI-RSRP.

In this regard, the UE may report a set of the specifying information (e.g., ID) and the RSRP or may report only a predetermined number of pieces of specifying information configured in order of higher strength to reduce the number of reporting bits. Information related to the predetermined number may be notified in advance by higher layer signaling (e.g., RRC signaling), physical layer signaling (e.g., DCI) or a combination of these.

Furthermore, the UE may report information indicating whether or not an RSRP measurement result exceeds a threshold configured in advance in response to specifying information (e.g., CSI-RS resource configuration information and/or a scrambling ID) configured in advance. The information related to the threshold may be notified in advance by higher layer signaling (e.g., RRC signaling), physical layer signaling (e.g., DCI) or a combination of these.

In addition, the UE may report a maximum number of CSI-RS configurations (and/or the number of groups) (that may be referred to as the number of measurement targets) that can be concurrently targeted by L1/L2 measurement reporting as capability information to a NW (e.g., base station). In addition, the number of measurement targets that can be concurrently targeted by L1/L2 measurement reporting may be defined by a specification. The base station may control the number of CSI-RS configurations based on the number of measurement targets. Furthermore, a reporting bit size of uplink L1/L2 signaling may be determined according to the configured number of measurement targets.

Furthermore, an operation in a case where measurement of the number of CSI-RS configurations (and/or the number of groups) exceeding the number notified by the capability information may be defined. The UE may make reporting bits that have exceeded capability and therefore are not yet measured by higher L1/L2 signaling a value corresponding to an "Out Of Range (OOR)" or a dedicated value (different from the OOR) associated with "not measured".

In addition, as L1/L2 measurement reporting described in the third embodiment, RSRP may be read as another index (e.g., received power (RSRQ) or received strength (RSSI)).

According to the above-described third embodiment, the UE can transmit information for specifying a CSI measurement reporting candidate beam/TRP in a shorter periodicity than that of RRM measurement reporting by using uplink L1/L2 signaling, so that it is possible to suitably dynamically switch a CSI measurement reporting target.

Fourth Embodiment

Information related to at least one of whether or not the above-described first measurement reporting method (where a CSI measurement reporting target is instructed to a UE by using downlink L1/L2 signaling and the UE reports CSI) is performed, whether or not the above-described second measurement reporting method (where the UE autonomously determines a CSI measurement reporting target and the UE reports CSI) is performed, and the above-described third measurement reporting method (where an RSRP measurement reporting target is configured to the UE and the UE reports an RSRP/ID by using uplink L1/L2 signaling) is performed may be notified.

The information may be explicitly notified by the NW (e.g., base station) to the UE by higher layer signaling (e.g., RRC signaling), physical layer signaling (e.g., DCI) or a combination of these.

Furthermore, the above information may be implicitly notified by notifying other information. When, for example, a number of CSI processes exceeding capability of the number of CSI processes is configured to the UE, the UE may decide to carry out the second measurement reporting method.

According to the above-described fourth embodiment, it is possible to switch a CSI measurement reporting method of the UE or instruct to perform L1/L2 measurement reporting, and consequently perform flexible control.

Modified Example

A CSI process according to LTE CoMP is a combination of a CSI-RS resource and a CSI-Interference Measurement (IM) resource. According to, for example, Rel-11 LTE, the number of CSI processes per carrier is four (maxCSI-Proc-r11=4) at maximum, the maximum number of Non Zero Power (NZP) CSI-RS resource configurations is three (maxCSI-RS-NZP-r11=3), and the maximum number of CSI-IM configurations is three (maxCSI-IM-r11=3). Furthermore, one CSI process is configured to include one CSI-RS configuration and one CSI-IM configuration.

The CSI measurement reporting according to the above embodiments may assume the following variations: (1) A CSI process in which a signal part (e.g., CSI-RS resource) and an interference part (e.g., CSI-IM resource) are associated on one-on-one basis is used, and (2) Parameters such as numbers and periodicities are independently configured to a signal part and an interference part. In a case of (1), a CSI-RS/IM resource can be configured according to the same policy as those of legacy LTE. In a case of (2), a CSI-RS/IM resource can be configured more flexibly than legacy LTE. The UE may be notified of configuration information of the signal part and/or the interference part by, for example, higher layer signaling.

(Radio Communication System)

The configuration of the radio communication system according to one embodiment of the present invention will be described below. This radio communication system uses one or a combination of the radio communication method according to each of the above embodiments of the present invention to perform communication.

Figure 7:
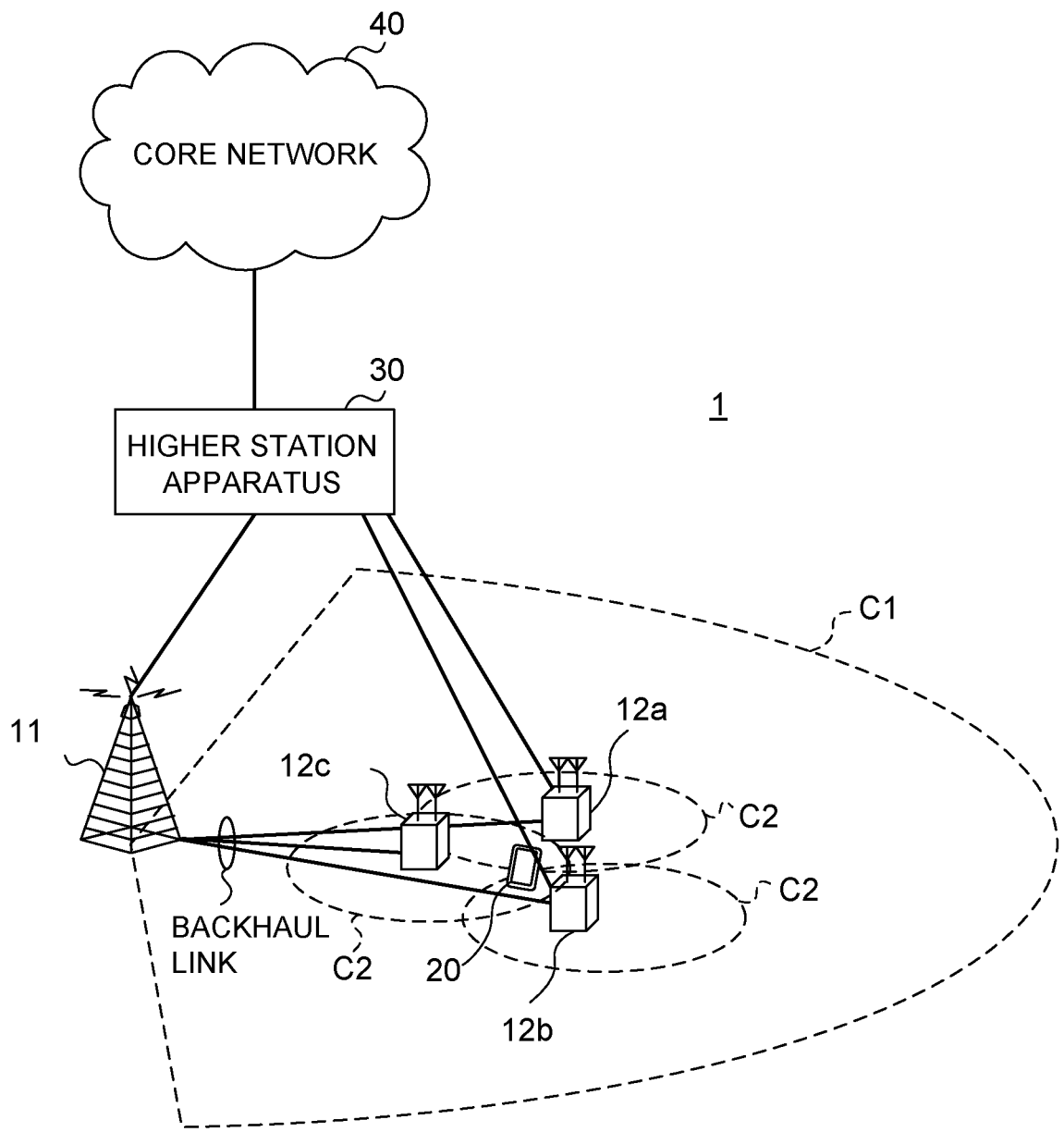
FIG. 7 is a diagram illustrating one example of a schematic configuration of a radio communication system according to one embodiment of the present invention.

FIG. 7 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and a New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of the respective cells and the user terminals 20 are not limited to those illustrated in FIG. 7. For example, each cell may be formed by a plurality of Transmission Reception Points (TRPs), and the radio base station 11 and/or the radio base station 12 may control one of a plurality of TRPs.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBS) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) (including, for example, scheduling information of the PDSCH and/or the PUSCH) is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 8:
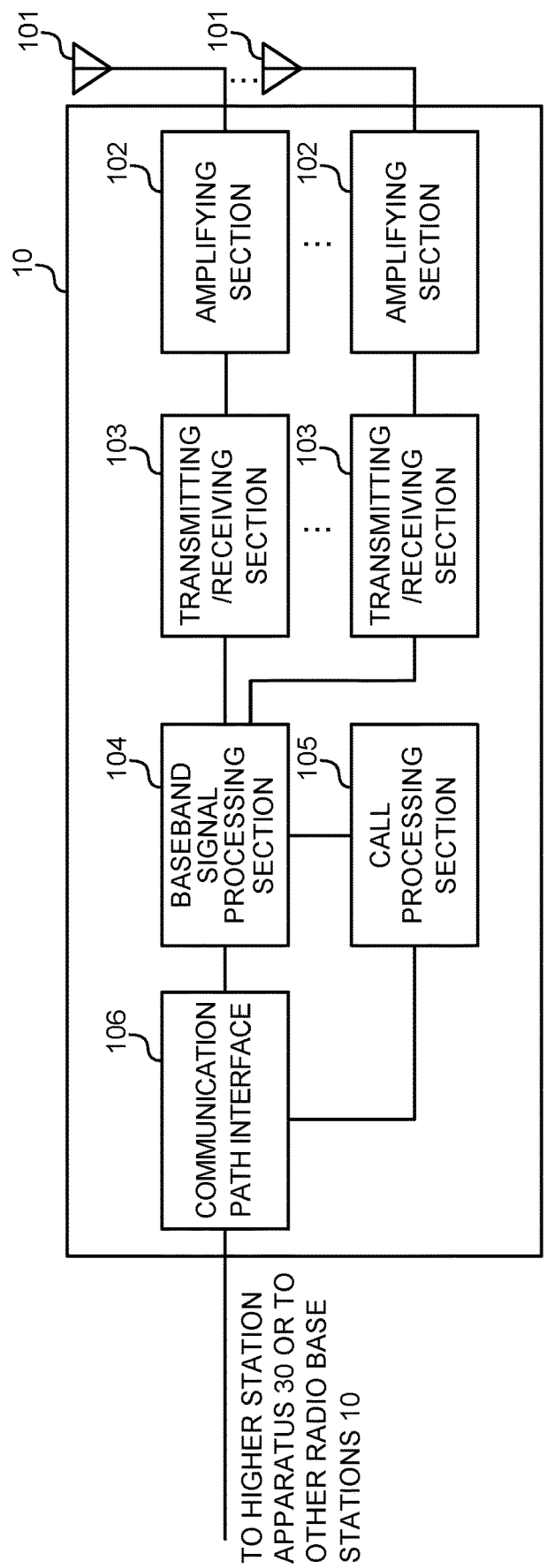
FIG. 8 is a diagram illustrating one example of an overall configuration of a radio base station according to the one embodiment of the present invention.

FIG. 8 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

On the other hand, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 101 can be composed of an array antenna, for example.

Each transmission/reception section 103 transmits a measurement signal (e.g., a CSI-RS or an MRS) employing a predetermined measurement resource configuration to the user terminal 20. For example, each transmission/reception section 103 may transmit a plurality of measurement signals employing respectively different measurement resource configurations by corresponding beams or TRPs. Furthermore, each transmission/reception section 103 may receive a measurement result (e.g., an RRM measurement result, an L1/L2 measurement result or a CSI measurement result) from the user terminal 20.

Each transmission/reception section 103 may transmit CSI measurement reporting target resource configuration information (e.g., a CSI-RS configuration index or a group index), information related to an association between a predetermined index and a resource configuration included in L1/L2 signaling, information for autonomously switching the CSI measurement reporting target (i.e., for deciding predetermined conditions), configuration information of a measurement signal for L1/L2 measurement reporting, and L1/L2 reporting configuration information.

Each transmission/reception section 103 may receive first specifying information (e.g., resource configuration information) for specifying the selected (measured) CSI measurement reporting target measurement signal, second specifying information (e.g., resource configuration information) for specifying a measurement signal subjected to power measurement (L1/L2 measurement), and information of the maximum configured number of measurement signals that can be L1/L2 measurement reporting targets.

Each transmission/reception section 103 may transmit the CSI measurement reporting target resource configuration information by downlink layer signaling. Furthermore, each transmission/reception section 103 may receive at least one of the above measurement result, the above first specifying information and the above second specifying information by higher layer signaling.

Figure 9:
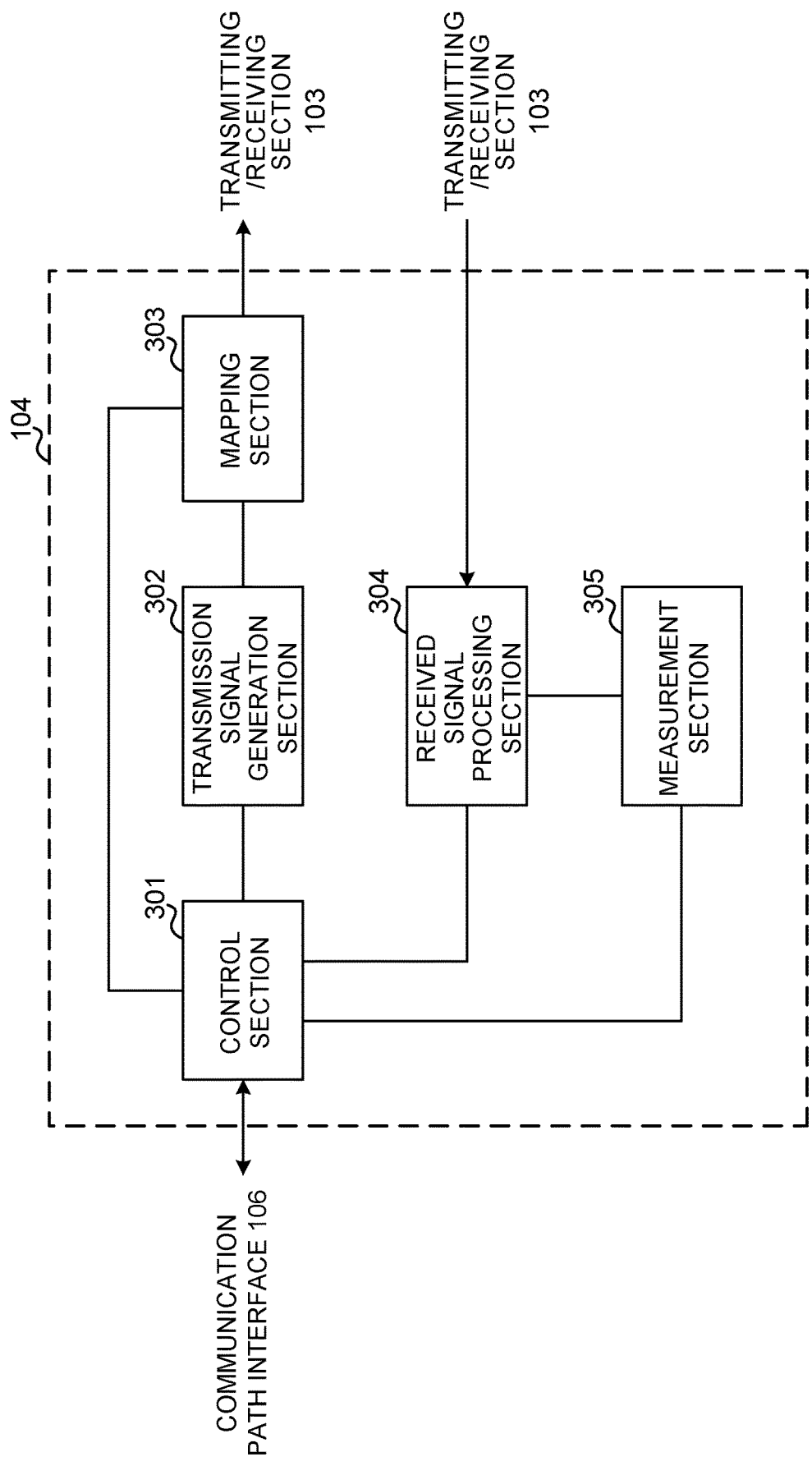
FIG. 9 is a diagram illustrating one example of a function configuration of the radio base station according to the one embodiment of the present invention.

FIG. 9 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal transmitted on the PDCCH and/or the EPDCCH that is transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal transmitted on the PUCCH and/or the PUSCH that is transmission acknowledgement information), a random access preamble (e.g., a signal transmitted on the PRACH) and an uplink reference signal.

The control section 301 performs control to form a transmission beam and/or a reception beam by using digital BF (e.g. precoding) of the baseband signal processing section 104 and/or analog BF (e.g., phase rotation) of each transmission/reception section 103. The control section 301 may perform control to form a beam based on downlink channel information and uplink channel information. The control section 301 may obtain these pieces of channel information from the received signal processing section 304 and/or the measurement section 305. In addition, transmission that uses a transmission beam may be paraphrased as transmission of a signal to which predetermined precoding has been applied.

The control section 301 performs control to transmit one of a plurality of measurement signals. The control section 301 may perform control to transmit CSI measurement reporting target resource configuration information to the user terminal 20 by using downlink L1/L2 signaling (DCI or a DL MAC CE). Furthermore, the control section 301 may perform control to transmit information for deciding the predetermined conditions to cause the user terminal 20 to autonomously select the CSI measurement reporting target.

In this regard, the resource configuration information may be information (e.g., group index) of a predetermined set (corresponding to a predetermined number of pieces of resource configuration information) including a predetermined number of (e.g., zero, one or a plurality of) measurement resource configurations.

The control section 301 may perform control to decide an L1/L2 measurement target measurement signal based on an RRM measurement result reported from the user terminal 20, and transmit configuration information (e.g., resource configuration information) of the measurement signal.

The control section 301 may perform control to decide a CSI measurement target measurement signal based on the L1/L2 measurement result reported from the user terminal 20, and transmit configuration information (e.g., resource configuration information) of the measurement signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a predetermined radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., Received Signal Strength Indicator (RSSI)) or channel information (e.g., CSI). The measurement section 305 may output a measurement result to the control section 301.

(User Terminal)

Figure 10:
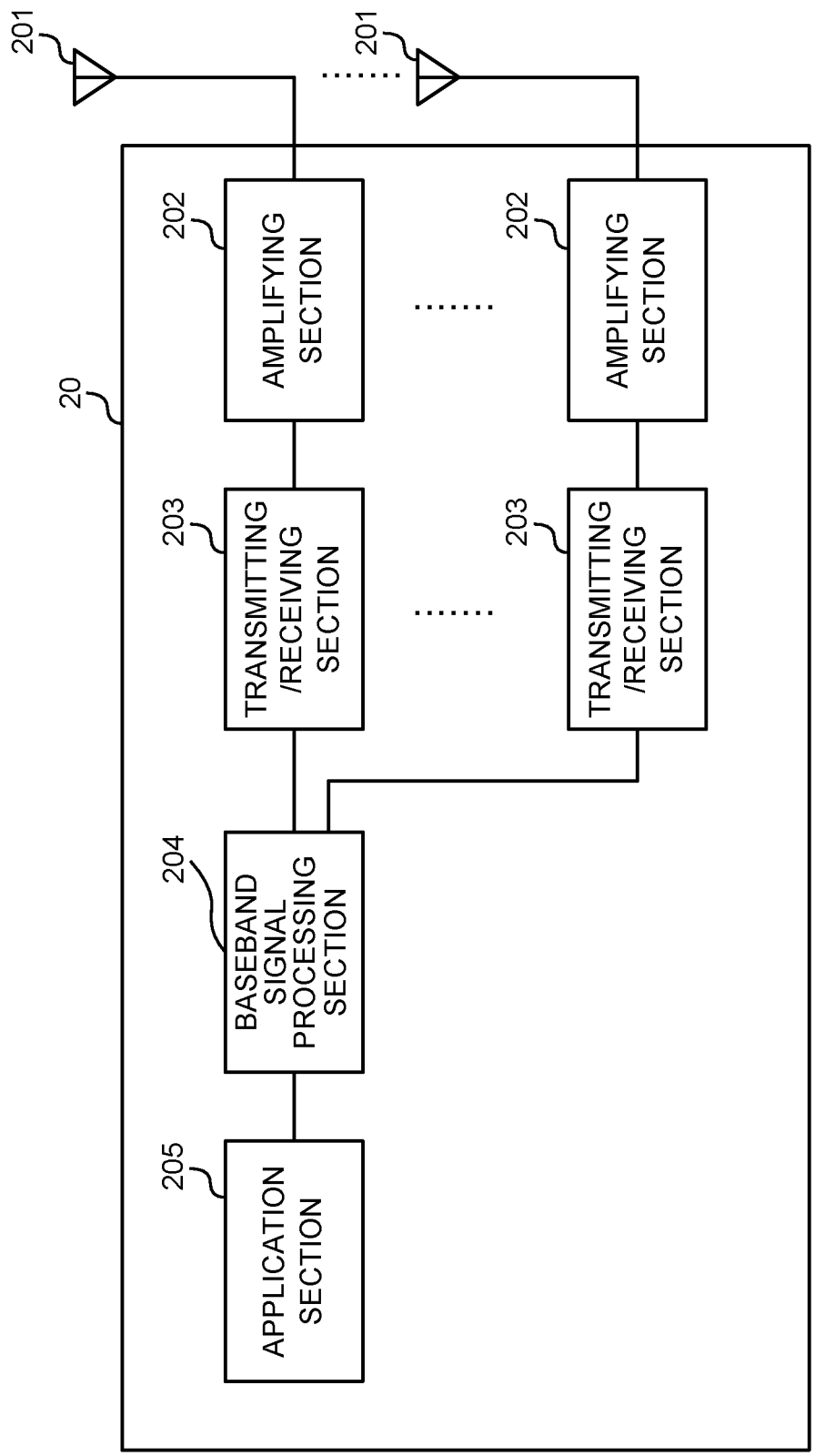
FIG. 10 is a diagram illustrating one example of an overall configuration of a user terminal according to the one embodiment of the present invention.

FIG. 10 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 can be composed of an array antenna, for example.

Each transmission/reception section 203 receives a measurement signal (e.g., a CSI-RS or an MRS) employing a predetermined measurement resource configuration from the radio base station 10. For example, each transmission/reception section 203 may receive a plurality of measurement signals employing respectively different measurement resource configurations. Furthermore, each transmission/reception section 203 may report (transmit) to the radio base station 10 a measurement result (e.g., an RRM measurement result, an L1/L2 measurement result or a CSI measurement result) output from the measurement section 405.

Each transmission/reception section 203 may receive CSI measurement reporting target resource configuration information (e.g., a CSI-RS configuration index or a group index), information related to an association between a predetermined index and a resource configuration included in L1/L2 signaling, information for autonomously switching the CSI measurement reporting target (i.e., for deciding predetermined conditions), configuration information of a measurement signal for L1/L2 measurement reporting, and L1/L2 reporting configuration information.

Each transmission/reception section 203 may transmit first specifying information (e.g., resource configuration information) for specifying a selected (measured) CSI measurement reporting target measurement signal, second specifying information (e.g., resource configuration information) for specifying a measurement signal subjected to power measurement (L1/L2 measurement), and information of the maximum configured number of measurement signals that can be L1/L2 measurement reporting targets.

Each transmission/reception section 203 may receive the CSI measurement reporting target resource configuration information by downlink layer signaling. Furthermore, each transmission/reception section 203 may transmit at least one of the above measurement result, the above first specifying information and the above second specifying information by higher layer signaling.

Figure 11:
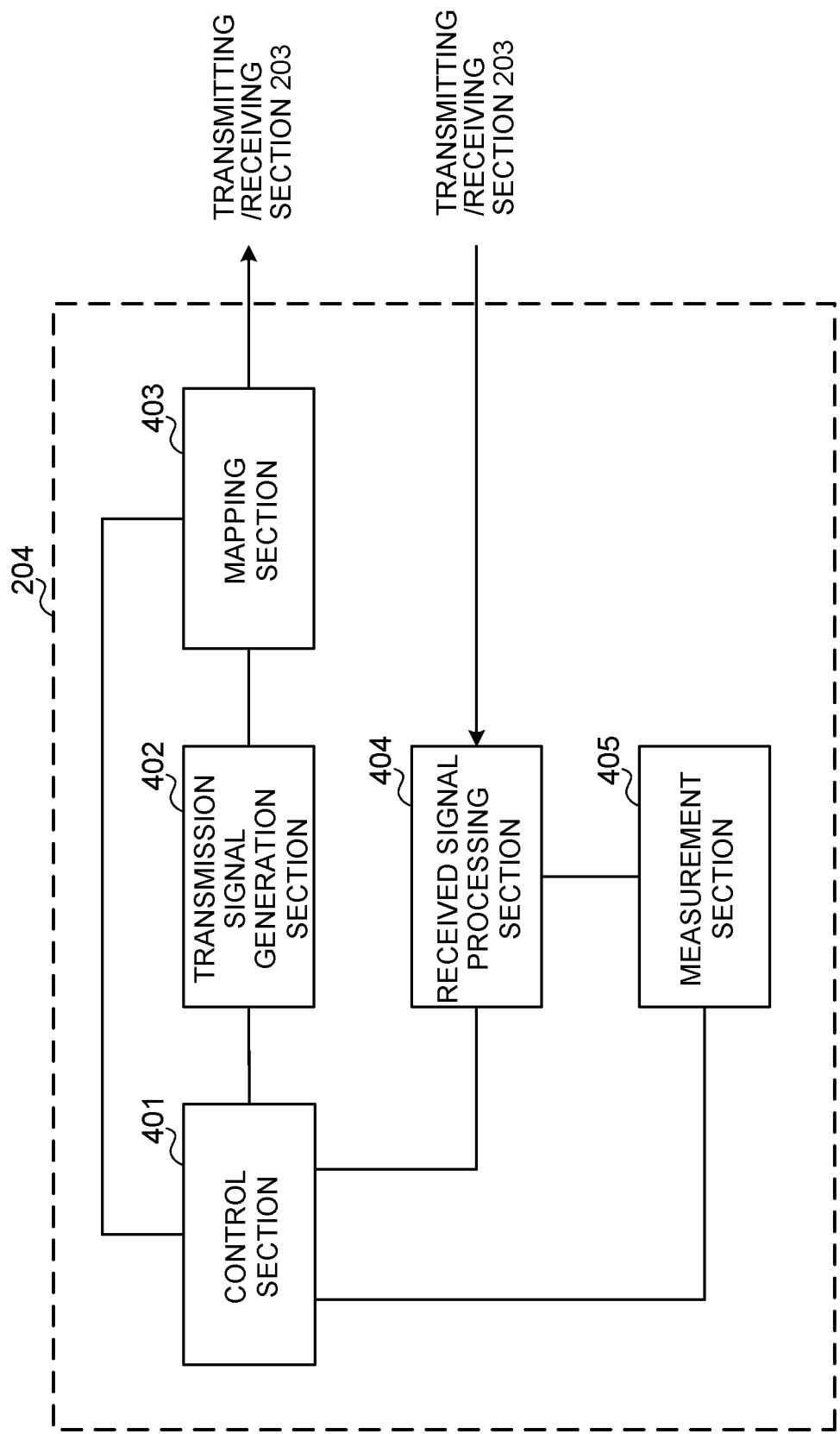
FIG. 11 is a diagram illustrating one example of a function configuration of the user terminal according to the one embodiment of the present invention.

FIG. 11 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may perform control to form a transmission beam and/or a reception beam by using digital BF (e.g., precoding) of the baseband signal processing section 204, and/or analog BF (e.g., phase rotation) of each transmission/reception section 203. The control section 401 may perform control to form a beam based on downlink channel information and uplink channel information. The control section 401 may obtain these pieces of channel information from the received signal processing section 404 and/or the measurement section 405.

The control section 401 may control measurement of a measurement signal of one or a plurality of received measurement signals corresponding to resource configuration information included in downlink L1/L2 signaling (such as DCI or a DL MAC CE). Furthermore, the control section 401 may control measurement of the measurement signal corresponding to the resource configuration information selected based on the predetermined conditions. Furthermore, the control section 401 may control measurement of the measurement signal corresponding to the resource configuration information included in RRC signaling.

In this regard, the resource configuration information may be information (e.g., group index) of a predetermined set (corresponding to a predetermined number of pieces of resource configuration information) including a predetermined number of (e.g., zero, one or a plurality of) measurement resource configurations.

The control section 401 may perform control to report a measurement result of the measurement signal corresponding to the resource configuration information selected based on the above predetermined conditions, and/or information for specifying the (CSI measurement reporting target) measurement signal corresponding to the selected resource configuration information.

The control section 401 may perform control to transmit received power information (e.g., RSRP) measured by the measurement section 405, and/or information for specifying the (L1/L2 measurement reporting target) measurement signal used for measurement of the received power information by uplink L1/L2 signaling.

The control section 401 may select one of measurement of the measurement signal corresponding to the resource configuration information included in downlink L1/L2 signaling, and measurement of the measurement signal corresponding to the resource configuration information selected based on the predetermined conditions based on information notified from the radio base station 10, and control the selected measurement.

Furthermore, the control section 401 may update parameters used for control based on the information when obtaining from the received signal processing section 404 various pieces of information notified from the radio base station 10.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 12:
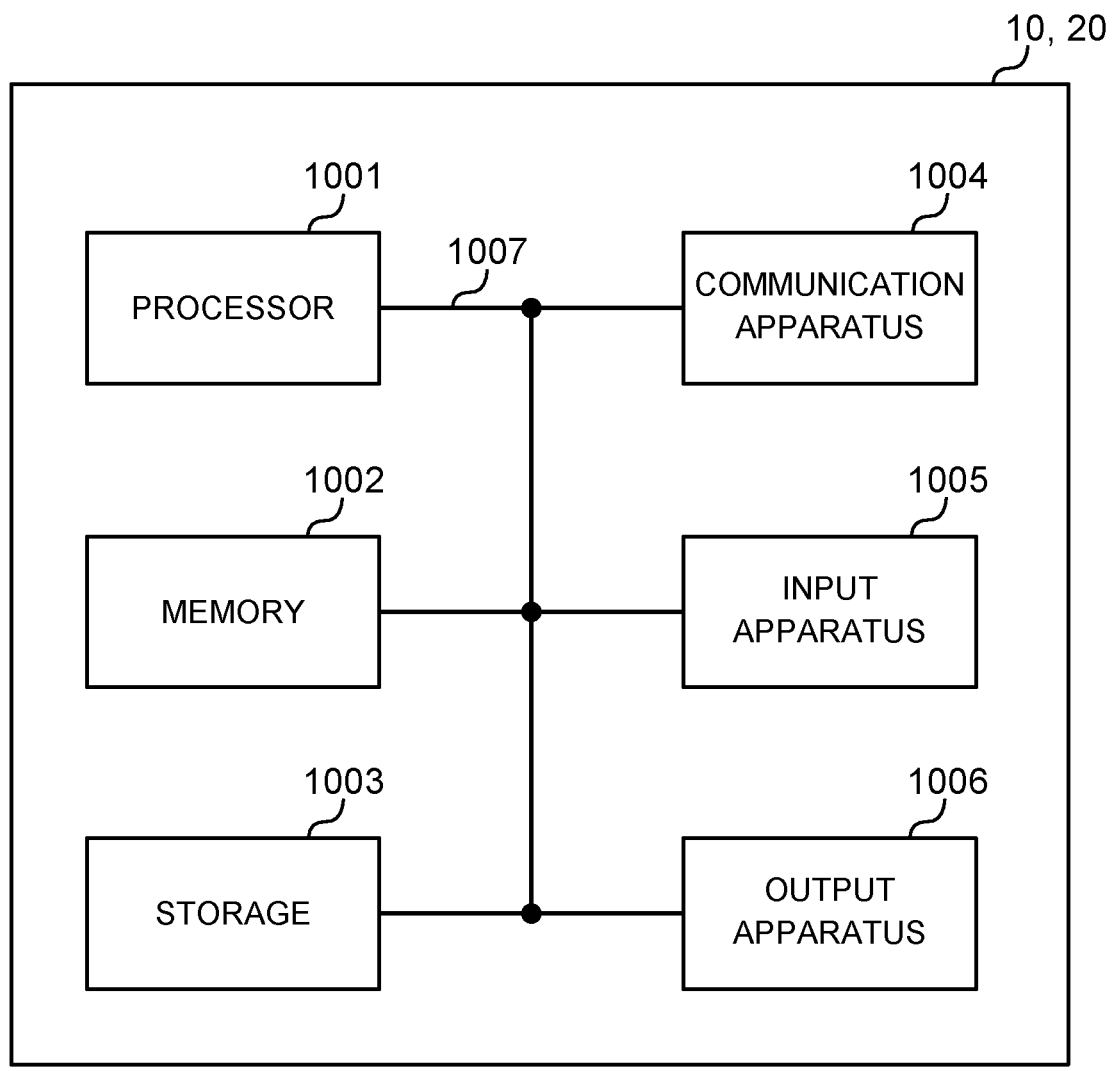
FIG. 12 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 12 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

Modified Example

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), a code block and/or a codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information). Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a Transmission Reception Point (TRP), a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The disclosure of Japanese Patent Application No. 2016-220933, filed on Nov. 11, 2016, including the specification, drawings, and abstract, is incorporated herein by reference in its entirety.

The invention claimed is:

1. A terminal comprising:
  a transmitter that transmits a maximum number of Channel State Information Reference Signal (CSI-RS) resource configurations for Channel State Information (CSI) measurement that can be concurrently targeted by Layer-1 or Layer-2 (L1 or L2) measurement reporting as capability information;
  a receiver that receives the CSI-RS resource configurations for the CSI measurement by Radio Resource Control (RRC) signaling; and
  a processor that controls CSI measurement reporting based on a group index that is an integer and that collectively indicates a group of two or more of the CSI-RS resource configurations respectively indicating resources of different CSI-RSs corresponding to different beams for the CSI measurement,
  wherein the processor controls the CSI measurement reporting based on a list configured by another RRC signaling, in which a plurality of group indexes including the group index are respectively associated with different groups of the CSI-RS resource configurations,
  wherein each of the plurality of the group indexes is an integer,
  wherein the processor determines a reporting bit size of uplink L1 or L2 signaling for the CSI measurement reporting according to a configured number of CSI-RS resource configurations that are concurrently targeted by the L1 or L2 measurement reporting, and
  wherein the group index is provided by Medium Access Control Control Element (MAC CE) and Downlink Control Information (DCI).

2. A radio communication method for a terminal, comprising:
  transmitting a maximum number of Channel State Information Reference Signal (CSI-RS) resource configurations for Channel State Information (CSI) measurement that can be concurrently targeted by Layer-1 or Layer-2 (L1 or L2) measurement reporting as capability information;

receiving the CSI-RS resource configurations for the CSI measurement by Radio Resource Control (RRC) signaling; and controlling CSI measurement reporting based on a group index that is an integer and that collectively indicates a group of two or more of the CSI-RS resource configurations respectively corresponding to different measurement signals, wherein the terminal controls the CSI measurement reporting based on a list configured by another RRC signaling, in which a plurality of group indexes including the group index are respectively associated with different groups of the CSI-RS resource configurations, wherein each of the plurality of the group indexes is an integer, wherein the terminal determines a reporting bit size of uplink L1 or L2 signaling for the CSI measurement reporting according to a configured number of CSI-RS resource configurations that are concurrently targeted by the L1 or L2 measurement reporting, and wherein the group index is provided by Medium Access Control Control Element (MAC CE) and Downlink Control Information (DCI).

3. A base station comprising:

a receiver that receives capability information indicating a maximum number of Channel State Information Reference Signal (CSI-RS) resource configurations for Channel State Information (CSI) measurement that can be concurrently targeted by Layer-1 or Layer-2 (L1 or L2) measurement reporting;

a transmitter that transmits the CSI-RS resource configurations for the CSI measurement by Radio Resource Control (RRC) signaling; and a processor that controls transmission of a group index that is an integer and that collectively indicates a group of two or more of the CSI-RS resource configurations respectively indicating resources of different CSI-RSs corresponding to different beams for the CSI measurement, wherein a plurality of group indexes including the group index are respectively associated with different groups of the CSI-RS resource configurations in a list configured by another RRC signaling, wherein each of the plurality of the group indexes is an integer, wherein a reporting bit size of uplink L1 or L2 signaling for the CSI measurement reporting is determined according to a number of CSI-RS resource configurations, configured by the base station, that are concurrently targeted by the L1 or L2 measurement reporting, and wherein the group index is used to control CSI measurement reporting and provided by Medium Access Control Control Element (MAC CE) and Downlink Control Information (DCI).

4. A system comprising:

a terminal that comprises:
  a transmitter that transmits a maximum number of Channel State Information Reference Signal (CSI-RS) resource configurations for Channel State Information (CSI) measurement that can be concurrently targeted by Layer-1 or Layer-2 (L1 or L2) measurement reporting as capability information;
  a receiver that receives the CSI-RS resource configurations for the CSI measurement by Radio Resource Control (RRC) signaling; and
  a processor of the terminal that controls CSI measurement reporting based on a group index that is an integer and that collectively indicates a group of two or more of the CSI-RS resource configurations respectively indicating resources of different CSI-RSs corresponding to different beams for the CSI measurement,
  wherein the processor of the terminal controls the CSI measurement reporting based on a list configured by another RRC signaling, in which a plurality of group indexes including the group index are respectively associated with different groups of the CSI-RS resource configurations,
  wherein each of the plurality of the group indexes is an integer,
  wherein the processor of the terminal determines a reporting bit size of uplink L1 or L2 signaling for the CSI measurement reporting according to a configured number of CSI-RS resource configurations that are concurrently targeted by the L1 or L2 measurement reporting, and
  wherein the group index is provided by Medium Access Control Control Element (MAC CE) and Downlink Control Information (DCI); and a base station that comprises:
  a transmitter that transmits the CSI-RS resource configurations; and
  a processor of the base station that controls transmission of the group index.

* * * * *